United States Patent [19]

DeLuca et al.

[11] 4,120,936
[45] Oct. 17, 1978

[54] PROCESS FOR CONVERSION OF $UF_6$ TO $UO_2$

[75] Inventors: John P. DeLuca, New Providence; Edward T. Maas, Jr., Kendall Park, both of N.J.

[73] Assignee: Exxon Research & Engineering Co., Linden, N.J.

[21] Appl. No.: 797,538

[22] Filed: May 16, 1977

Related U.S. Application Data

[63] Continuation-in-part of Ser. No. 773,129, Feb. 28, 1977, abandoned.

[51] Int. Cl.$^2$ .......................... C01G 43/02; C07F 5/00
[52] U.S. Cl. ................................. 423/261; 260/429.1; 423/11; 423/12
[58] Field of Search ................... 423/11, 12, 261, 253; 260/429.1

[56] References Cited

U.S. PATENT DOCUMENTS

| | | | |
|---|---|---|---|
| 2,906,598 | 9/1959 | Googin | 423/261 |
| 2,953,430 | 9/1960 | Leaders et al. | 423/261 |
| 3,333,930 | 8/1967 | Grant et al. | 423/253 |
| 3,579,311 | 5/1971 | McCoy | 423/261 |
| 3,998,925 | 12/1976 | Fuller | 423/261 X |

FOREIGN PATENT DOCUMENTS 766,691  9/1967  Canada ..................... 423/253

OTHER PUBLICATIONS

Chakravorti, M. C. et al., "Fluorcomplexes of Hexavalent Uranium-IV", J. Inorg. & Nuc. Chem., 34(9):2867–2874.
Chem. Abs., 76:92956n, 1972.
Chem. Abs., 82:132476n, 1975.
Dewan, J. C. et al., "Fluoride Crystal Structures", J. Chem. Society, Dalton, 1975, Issue 21, pp. 2171–2174.

*Primary Examiner*—Richard E. Schafer

[57] ABSTRACT

$UO_2$ for nuclear fuel is made from $UF_6$. The method involves injecting $UF_6$, with or without a nitrogen carrier, into a solution containing 1) an inert reaction medium, 2) water, 3) a Lewis base. The precipitate from the above reaction is then reduced in $H_2$ at a temperature below 750° C. to give ceramic grade $UO_2$.

29 Claims, No Drawings

PROCESS FOR CONVERSION OF $UF_6$ TO $UO_2$

This application is a continuation-in-part of application Ser. No. 773,129, now abandoned, filed Feb. 28, 1977.

BACKGROUND OF THE INVENTION

This invention relates to a process for converting $UF_6$ to $UO_2$.

Uranium for use as fuel for current light water reactors must be isotopically enriched to 2.5–3.0% $U^{235}$ from its naturally occurring level of 0.7% $U^{235}$. At present this is commercially accomplished through a gaseous diffusion scheme while next generation approaches involve the use of gas centrifuges. The material used in both instances is uranium hexafluoride, $UF_6$. After enrichment, the $UF_6$ must be converted to $UO_2$ which is the material widely used as nuclear reactor fuel.

Presently, there are several methods to effect this conversion. Among these are:

1. The dry process, in which gaseous $UF_6$ is initially hydrolyzed with dry steam in a fluidized bed to $UO_2F_2$ which is subsequently reduced in the same or another fluidized bed to $UO_2$ employing $H_2$ as the reducing agent.

2. The ADU process, where $UF_6$ is hydrolyzed with excess water to form $UO_2F_2$/HF aqueous solutions to which is added aqueous ammonia to effect precipitation of an Ammonium DiUranate which is separated from the liquid phase, dried, and then reduced to $UO_2$. (Alternatively, the hydrolysis solution may initially contain the ammonia to effect instantaneous precipitation following hydrolysis).

3. The AUC process which is similar to the ADU process but in which ammonium carbonate is employed to precipitate an Ammonium Uranyl Carbonate which is subsequently separated from the reaction solution, dried, calcined, and reduced to $UO_2$.

The ADU process which is the most widely used conversion method is plagued by such problems as uncontrollable stoichiometry of the resulting precipitates due to minor upsets in operating conditions (e.g., ammonium diuranate can precipitate with $NH_4/U$ ratios other than 1.0 as required by $(NH_4)_2U_2O_7$). This can, and does, affect the physical characteristics of the isolated material. This subsequently effects the sinterability of the resulting $UO_2$, an extremely critical parameter.

Also large amounts of liquid wastes and by-products are generated which must be handled and disposed of using environmentally acceptable methods. The AUC process also is plagued with problems similar to the ADU process.

The dry fluidized bed process can be hindered by problems arising from the inherent properties of the intermediate solid material, $UO_2F_2$(e.g., the hygroscopic nature of the $UO_2F_2$ and its propensity to cake can cause plugging of piping and reactors and can make solids transfer a very difficult operation). Also the $UO_2$ produced by the dry method has low surface area, spherical particles which are difficult to sinter to the desired density.

The novel process disclosed herein avoids the problems of non-stoichiometry, handling and sinterability. The process involves an intermediate compound derived from (1) the hydrolysis of $UF_6$ with water, and (2) the precipitation of the resulting $UO_2F_2$ from solution with a base. While $UO_2F_2$ is formed as an aqueous solution in the ADU process, no effort to utilize this $UO_2F_2$ in solution as an isolatable intermediate is made. This is due to its extremely high solubility in excess $H_2O$ which causes crystallization to be much less than quantitative and results in hard to handle syrups and semisolids very prone to caking if complete evaporation is attempted.

SUMMARY OF THE INVENTION

The present invention, broadly, is a process for converting $UF_6$ to $UO_2$. A single phase solution is formed including an active solution of water and a base selected from the group consisting of pyridine and substituted pyridines, N,N-disubstituted carboxylic acid amides, ammonia and mono-, di- and tri-substituted amines, sulfoxides and sulfones and a diluent, acetonitrile, which is inert to $UF_6$. $UF_6$ is added to this single phase liquid so that the $UF_6$ reacts with the combination of water and base to form a uranyl fluoride containing precipitate which is separated from the remaining single liquid phase, then $UO_2$ is obtained from the uranyl containing precipitate by means of thermal decomposition and reduction.

DESCRIPTION OF THE PREFERRED EMBODIMENT

The process of the present invention includes the combination of $UF_6$ with a single phase reaction media consisting of inert and active components for hydrolysis and precipitation of desired intermediate compounds from which $UO_2$ may be obtained.

The intermediate compounds are crystalline and are insoluble in the single phase reaction media enabling recovery of virtually all of the uranium. The precipitate is easily separated from the reaction media. All of the solids obtained from these reactions offer other benefits in that they are stoichiometric, that is, there is only one stable chemical formulation for each of the materials under reasonable variations in the chemical activities of all of the inert and active components and these intermediate compounds show no apparent hygroscopic tendencies. All of the intermediates can be thermally decomposed to $UO_2F_2$ and reduced to $UO_2$, the desired nuclear fuel material.

An active solution, which consists of water and a Lewis base, are combined in a reaction vessel. The active solution consists of a single liquid phase made of a preferred molar ratio of $H_2O$/base of between 2:$n$ and 1:$n$ where $n$ is the number of moles of the Lewis base per mole of uranium in the intermediate compounds necessary for stoichiometric formation of the desired precipitates.

A ratio of 2:$n$ satisfies stoichiometric proportions. A ratio of greater than 2:$n$ will leave an excess of water which may allow a loss of uranium as the intermediate compounds exhibit appreciable water solubility.

The Lewis bases employed can be: pyridine and substituted pyridines, $NC_5H_{5-x}R_x$; N,N-disubstituted carboxylic acid amides, $R_1CONR_2R_3$; ammonia and mono, di- and tri-substituted amines, $NH_{3-x}R_x$; and sulfoxides $R_1R_2SO$; and sulfones, $R_1R_2SO_2$.

An inert diluent is added to the active solution to prevent excessive deterioration of the Lew base because of direct reaction of the Lewis base with $UF_6$ before the desired hydrolysis occurs. General properties of the diluent include the following: inert to $UF_6$; non-reactive to $H_2O$ and the bases employed; non-degradable by HF; non-reactive to precipitate which is insoluble in the diluent. In addition, $H_2O$ and base are soluble in the diluent at standard conditions. The inert component and the active components form a single phase solution. A preferred inert medium is acetonitrile, $CH_3CN$.

The order in which the materials were combined in the steps described above is merely exemplary. The particular order which each of the ingredients of the single phase solution, i.e. water, base and diluent, are combined is not material.

The single phase solution is maintained at a temperature sufficient to prevent excessive vaporization of more volatile components and thus cause variations in reactant concentrations.

In general 0° to 80° C. is satisfactory. If the inert material is acetonitrile, then a preferred range is 5° to 25° C.

The quantity of active solution which is combined with the inert component depends upon the Lewis base which is used in making the active solution. If ammonia is used as the Lewis base commponent in the active solution, then the quantity of active components which is added to the inert component can range between 1.6 vol. % to 10 vol. % of the single phase solution. The solution which contains 1.6 vol. % active components is capable of hydrolyzing and precipitating 20 gm of uranium (29.6 gm. of $UF_6$) per liter of solution, while the solution containing 10 vol. % active components is capable of hydrolyzing and precipitating 120 gm. of uranium (177.5 gm of $UF_6$) per liter of solution. The preferred concentration of active components in the inert component when ammonia is used as the Lewis base is 5 vol. % active components and this concentration is sufficient to hydrolyze and precipitate 60 gm of uranium (89 gm of $UF_6$) per liter of solution. The stoichiometric requirements of base to uranium is 3:1 and, therefore, the preferred ratio of water to base is between 2:3 and 1:3.

If N,N-dimethylformamide (DMF) is used as the Lewis base component in the active solution, then the quantity of active components which is added to the inert component can range between 1.6 vol. % to 65 vol. %. The solution which contains 1.6 vol. % active components is capable of hydrolyzing and precipitating 35 gm of uranium (51 gm of $UF_6$) per liter of solution, while the solution containing 65 vol. % active components is capable of hydrolyzing and precipitating 1352 gm of uranium (2000 gm of $UF_6$) per liter of solution. The preferred concentration of active components in the inert component when DMF is used as the Lewis base is 15 vol. % active components and this concentration is sufficient to hydrolyze and precipitate 312 gm of uranium (461 gm of $UF_6$) per liter of solution. The stoichiometric requirements of base to uranium is 1:1 and, therefore, the preferred ratio of water to base is between 2:1 and 1:1.

If dimethylsulfoxide (DMSO) is used as the Lewis base component in the active solution, then the quantity of active components which is added to the inert component can range between 1.6 vol. % to 25 vol. %. The solution which contains 1.6 vol. % active components is capable of hydrolyzing and precipitating 37 gm of uranium (55 gm of $UF_6$) per liter of solution, while the solution containing 25 vol. % active components is capable of hydrolyzing and precipitating 555 gm of uranium (821 gm of $UF_6$) per liter of solution. The preferred concentration of active components in the inert component when DMSO is used as the Lewis base is 5 vol. % active components and this concentration is sufficient to hydrolyze and precipitate 111 gm of uranium (164 gm of $UF_6$) per liter of solution. The stoichiomeric requirements of base to uranium is 1:1 and, therefore, the preferred ratio of water to base is between 2:1 and 1:1.

If pyridine is used as the Lewis base component in the active solution, then the quantity of active components which is added to the inert component can range between 1.6 vol. % to 35 vol. %. The solution which contains 1.6 vol. % active components is capable of hydrolyzing and precipitating 35 gm of uranium (50 gm of $UF_6$) per liter of solution, while the solution containing 35 vol. % active components is capable of hydrolyzing and precipitating 714 gm of uranium (1056 gm of $UF_6$) per liter of solution. The preferred concentration of active components in the inert component when pyridine is used as the Lewis base is 10 vol. % active components and this concentration is sufficient to hydrolyze and precipitate 204 gm of uranium (322 gm of $UF_6$) per liter of solution. The stoichiometric requirements of base to uranium is 1:1 and, therefore, the preferred ratio of water to base is between 2:1 and 1:1.

The total reaction media, inert and active components is maintained as a single phase system before addition of uranium hexafluoride is attempted, and during the injection of $UF_6$ the liquids in the reactor must remain a single phase. This limits the concentrations of active components in the inert component if solubilities are not relatively high between all the components. This also limits temperature and pressure as they are related to phase equilibria. In practice, this is not found to be limiting in any realistic way because water, the four Lewis bases used (ammonia, DMF, DMSO and pyridine) and acetonitrile have relatively high mutual solubilities.

$UF_6$ is added to the reaction media where it reacts to form an intermediate compound which precipitates out. A preferred means for the addition of $UF_6$ is the injection of gaseous $UF_6$ diluted with a dry non-reactive gas, e.g. $N_2$, He, Ar, etc. The non-reactive gas acts only as a carrier for the $UF_6$ and after entry into the reaction media passes through the solution and is expelled. The rate of $UF_6$ injection into the stirred solution is found to be critical at the high rates of injection. There is no chemical limitation on the lower rate of $UF_6$ injection only a practical time consideration. The temperature of the gaseous $UF_6$ is between 25° C. and 100° C. A preferred temperature range is between 55° C. and 65° C. The temperature is a convenient way to control the pressure and thereby the flow rate of the $UF_6$ being injected.

The reaction vessel, containing the reaction medium and injected gas, is vigorously stirred to effect hydrolysis and precipitation of the desired intermediate compounds. The solution must be stirred to prevent large concentration gradients at the $UF_6$- liquid interface which can result in undesired side reactions.

Intermediate compounds isolatable as solids after hydrolysis and precipitations are either neutral complexes of the type $UO_2F_2.x(base)$ if the base is not easily protonated by the hydrogen fluoride produced from previous $UF_6$ hydrolysis (4 moles HF for every mole of $UF_6$ hydrolyzed), or if the Lewis base is strong enough to abstract a proton from the HF, compounds of the type $(BH)_n^+(UO_2F_{2+n})^{n-}$ will be formed which contain anionic fluoro complexes. Typical examples of both of these cases are given in Table 1.

TABLE 1
NEUTRAL COMPLEXES

| Base | Intermediate Compound Isolated |
|---|---|
| N,N-dimethylformamide (DMF) | $UO_2F_2 \cdot (1.0)DMF$ |
| dimethylsulfoxide (DMSO) | $UO_2F_2 \cdot (1.0)DMSO$ |

ANIONIC FLUORO COMPLEXES

| | |
|---|---|
| Pyridine (py) | $(pyH)UO_2F_3$ |
| Ammonia ($NH_3$) | $(NH_4)_3UO_2F_5$ |

The process described above may be carried out as a continuous or a batch process.

After the injection of $UF_6$ and precipitation is completed, the solid reaction product is isolated by usual separation techniques, such as filtration, centrifugation, etc., and dried. The supernatant reaction solution may be recovered for reuse. The precipitate may also be washed before drying with fresh reaction media solution or with the inert diluent to remove any soluble materials adhering to the precipitate.

Those skilled in the art could convert the precipitate to $UO_2$ by thermal and reductive means. However, the following preferred means results in high quality $UO_2$ powders, having low fluoride content, good oxygen to metal ratios and are readily sinterable.

The precipitated material, dried in air, is decomposed in a carbon dioxide-water vapor atmosphere at between 500° and 900° C. preferably between 650° and 700° C.

$CO_2$ is a preferred ingredient for the atmosphere for several reasons. Thermodynamic considerations yield $U_3O_8$ as the stable phase in this atmosphere. Attainment of the $U_3O_8$ phase is known to facilitate residual fluoride removal. In addition, $CO_2$ is non-toxic and cannot produce an explosive mixture with $H_2$ when $H_2$ is introduced to reduce $U_3O_8$ to $UO_2$. The composition and flow rate of the atmosphere is adjusted such that each mole of uranium is exposed to between 0.5 to 10 moles of $H_2O$ vapor per hour preferably between 3.5 and 4.5 moles of $H_2O$ vapor per hour for each mole of uranium and between 3 to 70 moles of carbon dioxide per hour, preferably between 3.0 and 3.5 moles of carbon dioxide per hour per mole of U. The precipitate is exposed to this above stated temperature and atmosphere for 5 to 60 minutes, preferably 25-35 minutes at which time the precipitate has been substantially (e.g. greater than 90%) converted to $U_3O_8$ and the flow of carbon dioxide is terminated and a flow of hydrogen is started. The temperature and water vapor flow remain unchanged. The flow of hydrogen is adjusted to a flow such that each mole of uranium is exposed to between 0.5 and 10 moles of $H_2$ per hour, and preferably between 3.25 and 3.75 moles of $H_2$ per hour. The uranium compounds are exposed to this above stated atmosphere for 45 to 90 minutes and preferably between 50 to 70 minutes to allow for complete decomposition and reduction to uranium dioxide as detected by the X-ray diffraction pattern of its flourite crystal structure. At the end of the reduction period at 650° to 700° C. the heating is terminated, the water vapor flow is terminated but the $H_2$ flow is allowed to continue while the sample is allowed to cool to below 100° C. with the thermal mass of the heat source at which time the $H_2$ flow is terminated. A substantial portion (greater than 99%) is converted to $UO_2$. Thereafter the $UO_2$ sample is removed.

EXAMPLE 1

Process for conversion of $UF_6$ to $UO_2$ via the $(NH_4)_3 UO_2F_5$ (ammonium uranyl fluoride)(AUF) precursor. In this specific example 5 vol. % of an active solution (consisting of 28 wt. % ammonia and 72 wt. % $H_2O$) was added to 95 vol. % acetonitrile. Five hundred $cm^3$ of the solution was prepared and placed in a one liter reactor with a mechanical stirrer. The $UF_6$ container was heated to 62° C. (with a resulting pressure of 19.9 psi absolute). The nitrogen carrier gas was introduced at 10 psig and a flow of 1.4 l/min. The $N_2$ was introduced at the bottom center of the reactor through a small orifice of approximately 0.040 inches. The mechanical stirrer was started and then the $UF_6$ supply was opened and allowed to mix (under its own pressure through a 0.0039 in. throttling orifice) with the $N_2$ carrier. The $UF_6$ flow under this condition was approximately 0.5 gm of $UF_6$ per minute with a pressure drop of approximately 5 psi across the orifice plate. The maximum rate of injection of $UF_6$ into the solution should not exceed 10 gm $UF_6$ per minute while the preferred rate of injection if 0.5 gm $UF_6$ per minute. The $UF_6$ entrained in the $N_2$ carrier was allowed to enter the stirred reactor. These conditions were allowed to exist until approximately 23 grams of solid were formed in the bottom of the reactor at which time the $UF_6$ supply was closed and the $N_2$ carrier was allowed to remove any residual $UF_6$ at which point the $N_2$ carrier and stirrer was stopped. The contents of the reactors (solid and liquid) were transferred to suitable container after which the solid was removed from the liquid using standard laboratory filtering procedures. The solids were air dried and X-rayed for identification. A single phase AUF solid was identified. The material was then placed in a gold boat and placed inside a two inch diameter $Al_2O_3$ tube fitted with end closures such that water vapor, $CO_2$ and $H_2$ could be introduced at will while the sample inside the $Al_2O_3$ tube is maintained at any preselected temperature. The $Al_2O_3$ tube with the sample was placed in a tube furnace and the $CO_2$ at the rate of 600 $cm^3$ per minute and the $H_2O$ at a rate of 0.063 $cm^3$ per minute were introduced to the sample, at the same time the furnace was turned on to increase the temperature of the sample to 750° C., this heat-up took approximately 10 minutes after which time the sample was held for 30 minutes at 750° C. under this atmosphere. It should be noted here that the water was put in the chambers as a liquid, but through a 1/16 inch dia. stainless steel tube heat exchanger such that the heat from the furnace vaporized the water and the sample was exposed to water vapor. After 30 minutes under the $CO_2/H_2O$ atmosphere at 750° C. the $CO_2$ flow was stopped and a flow of 600 $cm^3$ per minute of 15 vol. % $H_2$ and 85 vol. % Ar was introduced leaving the water flow unchanged. The Ar has no effect upon the desired reaction and is used only as a diluent to allow safer handling of the hydrogen. The sample was allowed to remain under these conditions for 60 minutes after which time the $H_2O$ flow was stopped, the furnace power turned off and the sample allowed to cool to below 100° C. under hydrogen. The sample was removed and analyzed. X-ray analysis showed it to be pure $UO_2$. The sample was further analyzed. See Table 2.

TABLE 2

| F ppm | Cl ppm | N ppm | C ppm | O/M oxygen/metal | U wt.% |
|---|---|---|---|---|---|
| 177 | <10 | 21 | 18 | 2.029 | 87.971 |

This sample was considered to be of acceptable quality for fabrication into a $UO_2$ fuel pellet.

EXAMPLE 2

Process for conversion of $UF_6$ to $UO_2$ via the (PyH)$UO_2F_3$ (pyridinium uranyl fluoride (PUF))precursor. In this specific example, 35 vol. % of an active solution (consisting of 68 wt. % pyridine and 32 wt. % $H_2O$) was added to 65 vol. % acetonitrile. Five hundred $cm^3$ of the solution prepared and placed in a one liter reactor with a mechanical stirrer. The $UF_6$ container was heated to 62° C. (with a resulting pressure of 19.9 psi absolute). The nitrogen carrier gas was introduced at 10 psig and a flow of 1.4 l/min. The $N_2$ was introduced at the bottom center of the reactor through a small orifice of approximately 0.040 inches. The mechanical stirrer was started and then the $UF_6$ supply was opened and allowed to mix (under its own pressure through a 0.0039 in. throttling orifice) with the $N_2$ carrier. The $UF_6$ flow under this condition was approximately 0.5 gm of $UF_6$ per minute with a pressure drop of approximately 5 psi across the orifice plate. The $UF_6$ entrained in the $N_2$ carrier was allowed to enter the stirred reactor. These conditions were allowed to exist until approximately 15.2 grams of solid were formed in the bottom of the reactor at which time the $UF_6$ supply was closed and the $N_2$ carrier was allowed to remove any residual $UF_6$ at which point the $N_2$ carrier and stirrer was stopped. The contents of the reactors (solid and liquid) were transferred to suitable container after which the solid was removed from the liquid using standard laboratory filtering procedures. The solids were air dried and X-rayed for identification. A single phase PUF solid was identified. The material was then placed in a gold boat and placed inside a two inch diameter $Al_2O_3$ tube fitted with end closures such that water vapor, $CO_2$ and $H_2$ could be introduced at will while the sample inside the $Al_2O_3$ tube is maintained at any preselected temperature. The $Al_2O_3$ tube with the sample was placed in a tube furnace and the $CO_2$ at the rate of 400 $cm^3$ per minute and the $H_2O$ at a rate of 0.043 $cm^3$ per minute were introduced to the sample, at the same time the furnace was turned on to increase the temperature of the sample to 750° C., this heat-up took approximately 10 minutes after which time the sample was held for 30 minutes at 750° C. under this atmosphere. It should be noted here that the water was put in the chamber as a liquid, but through a 1/16 inch dia. stainless steel tube heat exchanger such that the heat from the furnace vaporized the water and the sample was exposed to water vapor. After 30 minutes under the $CO_2/H_2O$ atmosphere at 750° C. the $CO_2$ flow was stopped and a flow of 400 $cm^3$ per minute of 15 vol. % $H_2$ and 85 vol. % Ar was introduced leaving the water flow unchanged. The Ar has no effect upon the desired reaction and is used only as a diluent to allow safer handling of the hydrogen. The sample was allowed to remain under these conditions for 60 minutes after which time the $H_2O$ flow was stopped, the furnace power turned off and the sample allowed to cool to below 100° C. under hydrogen. The sample was removed and analyzed. X-ray analysis showed it to be pure $UO_2$. The sample was further analyzed. See Table 3.

TABLE 3

| F ppm | Cl ppm | H ppm | C ppm | O/M oxygen/metal | U wt.% |
|---|---|---|---|---|---|
| 55 | <10 | 13 | 59 | 2.029 | 87.974 |

This sample was considered to be of acceptable quality for fabrication into a $UO_2$ fuel pellet.

EXAMPLE 3

Process for conversion of $UF_6$ to $UO_2$ via the $UO_2F_2.(1.0)DMF$ precursor. In this specific example 5 vol. % of an active solution consisting of 67 wt. % N,N-dimethylformamide and 33 wt. % $H_2O$) was added to 95 vol. % acetonitrile. Five hundred $cm^3$ of the solution was prepared and placed in a one liter reactor with a mechanical stirrer. The $UF_6$ container was heated to 6220 C. (with a resulting pressure of 19.9 psi absolute). The nitrogen carrier gas was introduced at 10 psig and a flow of 1.4 l/min. The $N_2$ was introduced at the bottom center of the reactor through a small orifice of approximately 0.040 inches. The mechanical stirrer was started and then the $UF_6$ supply was opened and allowed to mix (under its own pressure through a 0.0039 in. throttling orifice) with the $N_2$ carrier. The $UF_6$ flow under this condition was approximately 5 psi across the orifice plate. The $UF_6$ entrained in the $N_2$ carrier was allowed to enter the stirred reactor. These conditions were allowed to exist until approximately 15 grams of solid were formed in the bottom of the reactor at which time the $UF_6$ supply was closed and the $N_2$ carrier was allowed to remove any residual $UF_6$ at which point the $N_2$ carrier and stirrer was stopped. The contents of the reactors (solid and liquid) were transferred to suitable container after which the solid was removed from the liquid using standard laboratory filtering procedures. The solids were air dried and X-rayed for identification. A single phase $UO_2F_2.(1.0)DMF$ solid was identified. The material was then placed in a gold boat and placed inside a two inch diameter $Al_2O_3$ tube fitted with end closures such that water vapor, $CO_2$ and $H_2$ could be introduced at will while the sample inside the $Al_2O_3$ tube is maintained at any preselected temperature. The $Al_2O_3$ tube with the sample was placed in a tube furnace and the $CO_2$ at the rate of 390 $cm^3$ per minute and the $H_2O$ at a rate of 0.042 $cm^3$ per minute were introduced to the sample, at the same time the furnace was turned on to increase the temperature of the sample to 750° C., this heat-up took approximately 10 minutes after which time the sample was held for 30 minutes at 750° C. under this atmosphere. It should be noted here that the water was put in the chamber as a liquid, but through a 1/16 inch dia. stainless steel tube heat exchanger such that the heat from the furnace vaporized the water and the sample was exposed to water vapor. After 30 minutes under the $CO_2/H_2O$ atmosphere at 750° C. the $CO_2$ flow was stopped and a flow of 390 $cm^3$ per minute of 15 vol. % $H_2$ and 85 vol. % Ar was introduced leaving the water flow unchanged. The Ar has no effect upon the desired reaction and is used only as a diluent to allow safer handling of the hydrogen. The sample was allowed to remain under these conditions for 60 minutes after which time the $H_2O$ flow was stopped, the furnace power turned off and the sample allowed to cool to below 100° C. under hydrogen. The sample was removed and analyzed. X-ray analysis showed it to be pure $UO_2$. The sample was further analyzed. See Table 4.

TABLE 4

| F ppm | Cl ppm | N ppm | C ppm | O/M oxygen/metal | U wt.% |
|---|---|---|---|---|---|
| 31 | <10 | 14 | 29 | 2.024 | 88.000 |

This sample was considered to be of acceptable quality for fabrication to a $UO_2$ fuel pellet.

EXAMPLE 4

Process for conversion of $UF_6$ to $UO_2$ via the $UO_2F_2.(1.0)DMSO$ precursor. In this specific example 5 vol. % of an active solution (consisting of 68 wt. % dimethylsulfoxide and 32 wt. % $H_2O$) was added to 95 vol. % acetonitrile. Five hundred $cm^3$ of the solution was prepared and placed in a one liter reactor with a mechanical stirrer. The $UF_6$ container was heated to 62° C. (with a resulting pressure of 19.9 psi absolute). The nitrogen carrier gas was introduced at 10 psig and a flow of 1.4 l/min. The $N_2$ was introduced at the bottom center of the reactor through a small orifice of approximately 0.040 inches. The mechanical stirrer was started and then the $UF_6$ supply was opened and allowed to mix (under its own pressure through a 0.0039 in. throttling orifice) with the $N_2$ carrier. The $UF_6$ flow under this condition was approximately 0.5 gm of $UF_6$ per minute with a pressure drop of approximately 5 psi across the orifice plate. The $UF_6$ entrained in the $N_2$ carrier was allowed to enter the stirred reactor. These conditions were allowed to exist until approximately 10.7 grams of solid were formed in the bottom of the reactor at which time the $UF_6$ supply was closed and the $N_2$ carrier was allowed to remove any residual $UF_6$ at which point the $N_2$ carrier and stirrer was stopped. The contents of the reactors (solid and liquid) were transferred to suitable container after which the solid was removed from the liquid using standard laboratory filtering procedures. The solids were air dried and X-rayed for identification. A single phase $UO_2F_2.(1.0)DMSO$ solid was identified. The material was then placed in a gold boat and placed inside a two inch diameter $Al_2O_3$ tube fitted with end closures such that water vapor, $CO_2$ and $H_2$ could be introduced at will while the sample inside the $Al_2O_3$ tube is maintained at any preselected temperature. The $Al_2O_3$ tube with the sample was placed in a tube furnace and the $CO_2$ at the rate of 280 $cm^3$ per minute and the $H_2O$ at a rate of 0.030 $cm^3$ per minute were introduced to the sample, at the same time the furnace was turned on to increase the temperature of the sample to 750° C., this heat-up took approximately 10 minutes after which time the sample was held for 30 minutes at 750° C. under this atmosphere. It should be noted here that the water was put in the chamber as a liquid, but through a 1/16 inch dia. stainless steel tube heat exchanger such that the heat from the furnace vaporized the water and the sample was exposed to water vapor. After 30 minutes under the $CO_2/H_2O$ atmosphere at 750° C. the $CO_2$ flow was stopped and a flow of 280 $cm^3$ per minute of 15 vol. % $H_2$ and 85 vol. % Ar was introduced leaving the water flow unchanged. The Ar has no effect upon the desired reaction and is used only as a diluent to allow safer handling of the hydrogen. The sample was allowed to remain under these conditions for 60 minutes after which time the $H_2O$ flow was stopped, the furnace power turned off and the sample allowed to cool to below 100° C. under hydrogen. The sample was removed and analyzed. X-ray analysis showed it to be pure $UO_2$.

What is claimed is:

1. A process for converting $UF_6$ to $UO_2$ comprising:
    (a) forming a single phase solution including an active solution of water and a base selected from the group consisting of pyridine and methyl-substituted pyridines, N,N-disubstituted carboxylic acid amides, ammonia and mono-, di- and trimethyl substituted amines, sulfoxides and sulfones and an inert diluent acetonitrile.
    (b) adding $UF_6$ to said single phase solution so that said $UF_6$ reacts with said single phase solution to form a uranyl fluoride containing precipitate which is separated from the remaining single phase solution, and
    (c) converting said precipitate to $UO_2$ by thermal and reductive means.

2. The process of claim 1 in which said active solution includes water and base in the ration between $2:n$ and $1:n$, where $n$ is the number of moles of base per mole of uranium for stoichiometric formation of said uranyl fluoride containing precipitate.

3. The process of claim 1 in which said base is selected from the group consisting of ammonia, N,N-dimethylformamide, dimethylsulfoxide and pyridine.

4. The process of claim 1 in which said base is a methyl substituted pyridine.

5. The process of claim 1 in which said base is a N,N-disubstituted carboxylic acid amide.

6. The process of claim 1 in which said base is a monomethyl-substituted amine.

7. The process of claim 1 in which said base is a di-methyl-substituted amine.

8. The process of claim 1 in which said base is a tri-methyl-substituted amine.

9. The process of claim 1 in which said base is a sulfoxide.

10. The process of claim 1 in which said base is a sulfone.

11. The process of claim 3 in which said base is pyridine.

12. The process of claim 11 in which said water and base are in a ratio between 2:1 and 1:1.

13. The process of claim 3 in which said base is ammonia.

14. The process of claim 13 in which said water and base are in a ratio between 2:3 and 1:3.

15. The process of claim 3 in which said base is N,N-dimethylformamide.

16. The process of claim 15 in which said water and base are in a ratio between 2:1 and 1:1.

17. The process of claim 3 in which said base is dimethylsulfoxide.

18. The process of claim 17 in which said water and base are in a ratio between 2:1 and 1:1.

19. The process of claim 11 in which said active solution is between 1.6 vol. % and 35 vol. % of said single phase solution.

20. The process of claim 13 in which said active solution is between 1.6 vol. % and 10 vol. % of said single phase solution.

21. The process of claim 15 in which said active solution is between 1.6 vol. % and 65% of said single phase solution.

22. The process of claim 17 in which said active solution is between 1.6 vol. % and 25 vol. % of said single phase solution.

23. The process of claim 1 in which said step of converting said precipitate comprises:
    (a) combining said precipitate with $H_2O$ vapor and gaseous $CO_2$ for a period of time until a substantial portion of said precipitate has been converted to $U_3O_8$;
    (b) combining the remaining precipitate and $U_3O_8$ with $H_2O$ vapor and $H_2$ for a period of time until a substantial portion of precipitate has been converted to $UO_2$.

24. The process of claim 23 in which said step of converting is performed at a temperature between 500° C. and 900° C.

25. The process of claim 24 in which said temperature is between 650° C. and 700° C.

26. The process of claim 23 in which said combining steps are performed by exposing each mole of uranium to between 0.5 to 10 moles of $H_2O$ vapor per hour and to between 3 and 70 moles of $CO_2$ per hour and to between 0.5 and 10 moles of $H_2$ per hour.

27. The process of claim 26 in which said each mole of uranium is exposed to between 3.5 and 4.5 moles of $H_2O$ per hour and to between 3.0 and 3.5 moles of $CO_2$ per hour and to between 3.25 and 3.75 moles of $H_2$ per hour.

28. The process of claim 23 in which step (a) is performed for a period of time between 5 and 60 minutes and step (b) is performed for a period of time between 45 and 90 minutes.

29. The process of claim 28 in which said step (a) is performed for a period of time between 25 and 35 minutes and step (b) is performed for a period of time between 50 and 70 minutes.

* * * * *